United States Patent Office 3,312,497
Patented Apr. 4, 1967

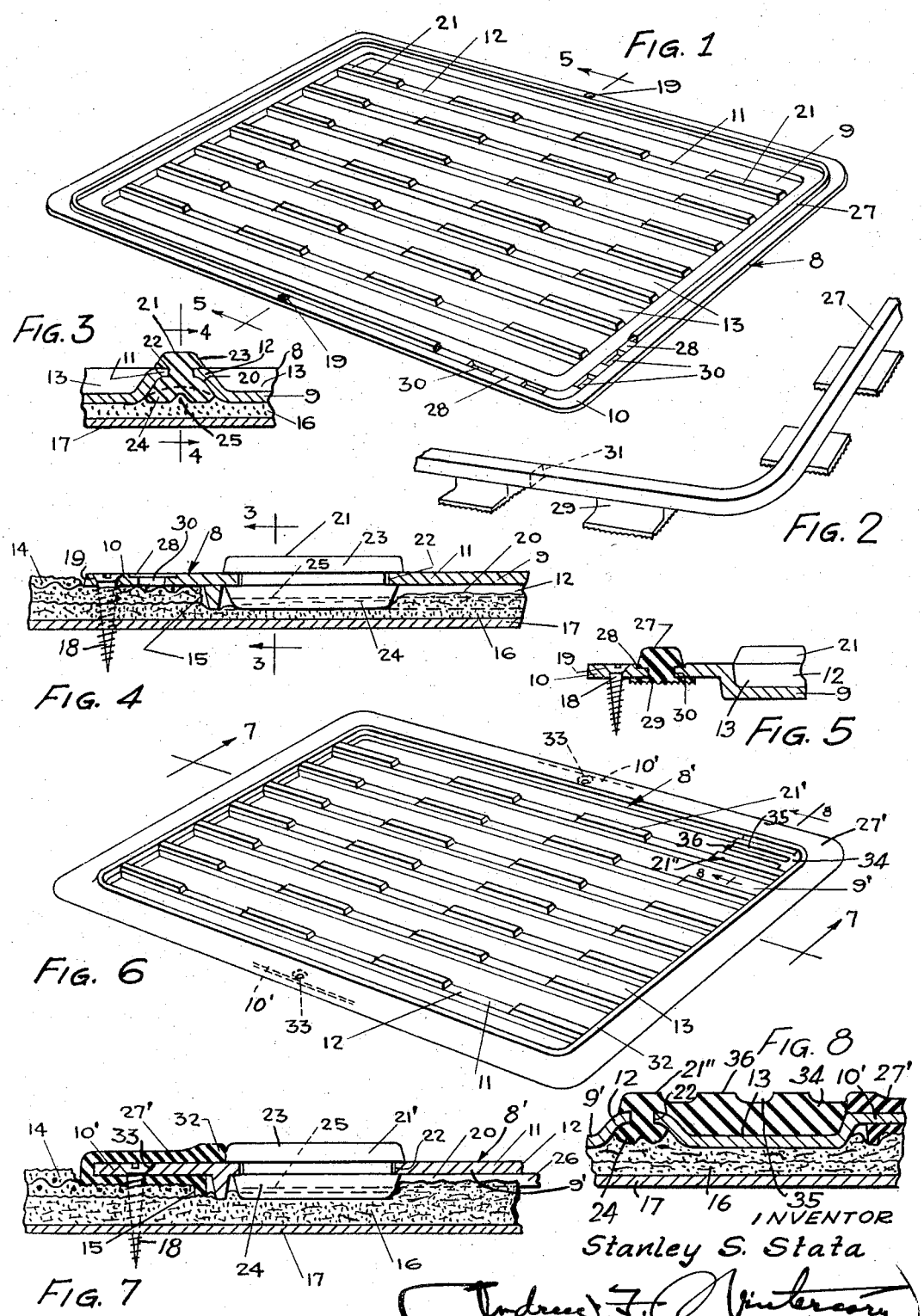

3,312,497
FLOOR GRATINGS AND ACCOMPANYING
DIRT AND WATER RECEPTACLES FOR
MOTOR VEHICLES
Stanley S. Stata, 301 Longwood St.,
Rockford, Ill. 61107
Filed Dec. 8, 1964, Ser. No. 416,870
14 Claims. (Cl. 296—1)

This invention relates to floor gratings and accompanying dirt and water receptacles for motor vehicles, and is more particularly concerned with improvements on the constructions disclosed in my Patents 3,082,032 and 3,149,875, issued Mar. 19, 1963 and Sept. 24, 1964, respectively.

The principal object of my invention is to provide in the form of a one-piece casting or sheet metal stamping, a floor grating having spaced parallel scraping ribs formed integral with the bottom of a shallow generally rectangular pan designed to collect moisture and dirt and retain the moisture during evaporation while leaving the top surfaces of the ribs fairly dry, the pan having a marginally projecting flange on all four sides in which are provided holes in at least two diametrically opposite sides of the pan to receive screws or other means of fastening the unit to the floor of the vehicle, only enough of the carpet being cut out to accommodate the downwardly projecting pan while leaving the sound deadening jute for the pan to rest on and serve as a sound deadener between it and the metal floor under it, the flange resting on the carpet compressing it and the jute too in the fastening of the unit to the floor sufficiently to lie substantially flush with the rest of the carpet, so that dirt can be swept off the carpet into the pan conveniently. The pans can easily be cleared of dirt at intervals with a vacuum cleaner, so that these floor gratings make for cleanliness in motor vehicles besides greatly improving the appearance of the car's interior and eliminating the inevitable eye-sore condition that results when the carpeting becomes worn at certain spots. Existing cars with badly worn spots in the carpeting can therefore be fitted with these gratings and made to look like new.

Another object of the invention, designed to enhance the appearance of the ribs, while adding non-skid protection, is the provision of hollow scraping ribs with molded rubber or resilient plastic scraper cleats insertable with a water-tight fit through slots provided in the top walls of the hollow ribs, these non-metallic projections giving a sound deadening effect in addition to improving the appearance of the unit as a whole. The cleat inserts may be separate or they may be interconnected by intermediate link connections concealed inside the hollow ribs under the top walls. To add further anti-skid means I propose to cover the flange with a molded rubber or resilient plastic band that either encases the flange completely on all four sides of the pan and has its top surface flush with the top surfaces of the aforementioned non-skid cleats, or provide a narrow band or bead designed to fit in an annular groove provided in the top surface of the flange and having integral therewith, at longitudinally spaced points, a series of lugs of generally T-shaped cross-section arranged to be anchored in slots provided therefor in the flange in longitudinally spaced relation along the annular groove. The cleat at one front corner is omitted in the grating for the driver and a heel pad is inserted as a rest for the heel of the right foot behind the accelerator pedal and is preferably made integral with an adjacent scraper cleat mounted in a slot in a hollow rib, so as to be held thereby against accidental displacement.

The invention is illustrated in the accompanying drawing in which—

FIG. 1 is a perspective view of a floor grating showing the anti-skid cleats projecting upwardly from the ribs and showing the anti-skid band or bead with a portion thereof broken away to show the groove in the flange and also the spaced slots for anchoring the lugs provided on the band or bead;

FIG. 2 is a slightly enlarged perspective view of a portion of the anti-skid bead removed from the grating;

FIGS. 3 and 4 are sections taken at right angles to each other, as indicated by the line 3—3 in FIG. 4 and line 4—4 in FIG. 3, and illustrating how the floor grating is supported partly on the jute under the carpet and partly on the carpet when fastened to the metal floor by means of sheet metal screws, as shown in FIGS. 4 and 5, FIG. 5 being a sectional detail in the plane of line 5—5 of FIG. 1;

FIG. 6 is another perspective similar to FIG. 1 but showing the heel pad in the right front corner, and also a different form of molded rubber or resilient plastic band enclosing the marginal flange of the pan;

FIG. 7 is a sectional detail on the line 7—7 of FIG. 6, along the lines of FIG. 4, illustrating how the grating rests partly on the jute and partly on the carpet when fastened to the floor by self-tapping metal screws similarly as in the first form, this section showing the band completely enclosing the flange, and also showing a different form of cleats similar in section to FIG. 3, all of these cleats for each row being, however, molded integral with one another, the neighboring cleats being inter-connected by a link portion enclosed inside the hollow rib of the grating, and FIG. 8 is a sectional detail showing the heel pad integral with and held in place by an adjacent scraping cleat mounted in a slot in the adjacent hollow rib, this section being taken on line 8—8 of FIG. 6.

Similar reference numerals are applied to corresponding parts in the views.

Referring to the drawing and first to FIGS. 1 to 5, the reference numeral 8 designates generally a floor grating of my invention consisting of a one-piece aluminum alloy casting or sheet metal stamping providing a generally rectangular recessed pan 9 with a marginal flange 10 around the top thereof and flush with the top walls 11 of spaced parallel hollow ribs 12 that are cast or stamped integral with the pan and serve as shoe scrapers, the dirt and water scraped off being collected in the pan 9 in the troughs 13 left between the ribs, so that the tops of the ribs 12 always remain fairly dry. The water retained in the pan 9 is evaporated fairly quickly and the dirt can be cleared out at intervals with a vacuum cleaner to keep the car tidy. In fact, these pans 9 can have dirt swept into them from the surrounding carpet 14 to keep the entire car interior in a much tidier fashion than has been possible heretofore without these floor gratings 8. The floor gratings, being of metallic construction are quite durable. Existing cars having badly worn spots in the carpeting can be fitted with these gratings and made to look like new. To install the gratings, one need only cut a rectangular hole in the carpet large enough to accommodate the pan portion 9, as indicated at 15 in FIG. 4, and arrange the jute sound deadener 16 to level the pan 9 when resting on the jute, the latter serving then as a sound deadener between the pan and the metallic floor 17 of the car, while the flange 10 rests on the carpet 14. When the grating is fastened to floor 17 by means of two or more screws like that indicated at 18 in FIG. 5 entered in holes 19 provided therefor in flange 10, the carpet 14 and jute 16 are compressed, causing the flange 10 to lie substantially flush with the surrounding carpet, substantially as shown in FIG. 4, making it much easier to sweep dirt off the carpet into the pan, while the jute 16 welling up inside the hollow ribs 9, as seen at 20 in FIGS. 3 and 4, serves to resist any tendency toward lateral displacement of the floor grating from its set position, even if there are only two screws 18 used on diametrically opposite sides of the unit, as indicated in FIG. 1, where there are only two screw holes 19 shown.

Partly for non-skid protection and partly for enhanced appearance, I provide four rows of molded rubber or resilient plastic scraper cleats 21 on the seven ribs 11, these cleats being insertable with a water seal fit from below through elongated slots 22 provided in the top wall 11 of the hollow ribs 12, as best appears in FIG. 3, the exposed upper portions 23 of the cleats being flat on the top and having sloping sides that are flush with the side walls of the rib 12 so that dirt scraped off shoes will drop into the pan 9, while the enlarged lower portions 24 of the cleats substantially fill the hollow ribs the full width thereof the full length of the cleats for good anchorage, a V-groove 25 extending lengthwise of the lower portion 24 affording an opportunity for the jute 16 to well up into this groove 25 and thus further tend to hold the unit against displacement from a set position. These cleats may be separate, as shown in FIGS. 3 and 4, or a number of them may be molded in one strip and interconnected by intermediate link connections 26, as shown in FIG. 7, where they interconnect the four cleats 21' of each rib 12 of pan 9' of grating 8', these connections 26 being concealed inside the hollow ribs 12 under the top wall 11. These cleats 21' are otherwise the same as cleats 21, and have V-grooves 25 in their lower portions to interlock with the jute 16 and resist lateral displacement of the pan 9' from its set position on the floor.

Partly to increase the non-skid protection and partly to enhance the appearance of the unit as a whole, I provide a molded rubber or resilient plastic band or bead 27 fitting closely in an annular groove 28 provided in the top surface of the flange 10 and having its top surface lying flush with the top surfaces of the aforementioned non-skid cleats 21 (or 21', if that type of cleats is used), the bead being anchored in place in the groove by a plurality of longitudinally spaced elongated T-shaped lugs 29 molded integral with the bottom of the bead and entered in elongated slots 30 provided in the flange in longitudinally spaced relation along the annular groove 28. The band or bead 27 is preferably of endless one-piece construction, although no reason can be seen for not having it of split one-piece construction with opposite ends either abutting or cemented together, as indicated in dotted lines at 31 in FIG. 2.

The other construction shown in FIGS. 6 and 7 has the molded rubber or resilient plastic band 27' completely encasing the flange 10' on all four sides of the pan 9', the band being applied to the flange on two adjacent sides of the pan and being then stretched enough to permit slipping it over the flange on the other two sides of the pan. An inner edge portion 32 of the top wall of the band 27' is made thicker, as best appears in FIG. 7, so that its top surface is substantially flush with the tops of the cleats 21' (or 21, if that type is used), and hence there is no difficulty in sweeping dirt off the carpet 14 over the band 27' and into the pan 9'. Holes 33 are provided in the flange 10' on diametrically opposite sides of the pan for insertion of the screws 18 that serve to fasten the unit to the floor 17 in the same way as described above in regard to the first mentioned construction, the top portion of band 27' being stretched out of the way while the screws 18 are applied.

The operation of both constructions is substantially the same. Both types of units are applied to the floor in substantially the same way. In scraping dirt or snow off the shoes the scraping action is performed partly by the ribs 12 and partly by the cleats 21 or 21'. Whatever water may be collected in the pan 9 or 9' is soon evaporated, but, even before that occurs, the tops of the ribs 12 are fairly dry, and, of course, the cleats 21 or 21' which are installed in watertight relationship to the ribs 12, serve to keep the bottom of the shoes elevated above the level of the ribs 12 enough to insure even more comfort than would otherwise be possible with the ribs 12 alone, and, as stated above, the cleats not only afford good anti-skid protection but add considerably to the nice appearance of the unit as a whole, and that is also true in regard to the bead or band 27 or the band 27'. Thus, I retain the advantages of metallic construction without any of its disadvantages. The metallic pans 9 and 9' are extremely durable. If the cleats 21 or 21' become worn enough to warrant it, they may be replaced at low cost. The same is true, of course, in regard to the band or bead 27 and the band 27'. The rubber or plastic cleats 21 or 21' and the rubber or plastic band or bead 27 or 27' provide a pleasing contrast to the polished top surfaces of the metallic ribs 12, and, of course, these molded rubber or plastic parts can be made available in a variety of solid and mixed colors to match or contrast nicely to the upholstering in a car and thereby further improve appearance and appeal to the most fastidious taste.

In conclusion, attention is called to the right front corner of the pan 9' in FIG. 6 and the related sectional detail FIG. 8, showing the heel pad 34 of molded rubber or resilient plastic material, which is of generally rectangular form and has a press fit in the trough 13 at this corner of the pan and has a rear cleat portion 21'' molded integral therewith, the latter having an elongated anchoring portion 24 insertable from above through the slot 22 and making a watertight joint with the rib 12. This pad 34 can be used with either of the gratings 8 or 8' and will be used only where the grating 8 or 8' is installed at the driver's position, the pad 34 being disposed directly behind the accelerator pedal as a rest for the heel of the driver's right shoe. A cleat 21 or 21' is used otherwise at this corner. The longitudinal grooves 35 in the top surface of the pad 34 drain into the trough 13 at their inner ends and the ribs 36 between these grooves provide the desired non-skid surface to reduce likelihood of slippage of the operator's foot while he is depressing the accelerator pedal.

It is believed the foregoing description conveys a good understanding of the objects and advantages of my invention. The appended claims have been drawn to cover all legitimate modifications and adaptations.

I claim:

1. In a floor grating construction for vehicles, a substantially horizontal metallic floor supporting a layer of compressible sound-deadening and insulating material with carpeting overlying the same that is also of compressible material, a shallow pan of relatively rigid metallic material resting on the first mentioned layer of compressible sound deadening material when set in an opening provided therefor in the carpeting and having a marginal flange above the level of the bottom of the pan and overlying the carpeting, means securing said pan by its flange to said floor compressing both of the aforementioned compressible materials so that the flange lies substantially flush with the top of the carpeting surrounding the same and dirt can be swept off the carpeting into the pan conveniently, and shoe scraper grating means provided in said pan, comprising spaced parallel ribs of metallic construction in fixed relation to the pan, and elongated cleats of non-skid material secured to the tops of said ribs and extending lengthwise thereof in longitudinally spaced relationship to one another.

2. A floor grating construction for vehicles as set forth in claim 1, wherein said ribs are integral with said pan and hollow and open on the under side of the pan and said cleats have integral lugs on the bottom thereof entered with a water-tight fit in slots provided therefor in the top of said ribs, the compressible sound deadening material when compressed in the fastening of the pan to the floor being caused to project upwardly inside said ribs to resist displacement of the pan from a fixed position.

3. A floor grating construction for vehicles as set forth in claim 2, wherein said cleats have grooves provided in their anchoring portions into which the floor covering material is also caused to project when the pan is fastened to the floor, whereby to further resist displacement of the pan from a fixed position.

4. A floor grating construction for vehicles as set forth in claim 1, wherein said ribs are integral with said pan and hollow and said cleats have integral lugs on the bottom thereof entered with a water-tight fit in slots provided therefor in the top of said ribs, the cleats and their lugs being of compressible resilient material and the lugs extending through said slots, the lugs on neighboring cleats being interconnected by strips made integral therewith and disposed inside said ribs.

5. A floor grating construction for vehicles as set forth in claim 1, wherein the cleats project slightly above and having their top surfaces in a common plane parallel to the horizontal plane of the tops of said ribs so as to provide shoe supporting surfaces in elevated relation to the tops of said ribs while still permitting scraping action of shoes on the cleats and ribs.

6. A floor grating construction for vehicles as set forth in claim 1, wherein there is also a bead or band mounted on the flange annularly of the pan, said bead or band being of non-skid material and providing a top surface substantially flush with the tops of said cleats.

7. A floor grating construction for vehicles as set forth in claim 1, wherein there is also a bead or band mounted on the flange annularly of the pan, said bead or band being of non-skid material and providing a top surface substantially flush with the tops of said cleats, said bead or band having anchoring lugs on the bottom thereof entered in slots provided in said flange in longitudinally spaced relation in register with said lugs.

8. A floor grating construction for vehicles as set forth in claim 1, wherein there is also a bead or band mounted on the flange annularly of the pan, said bead or band being of non-skid material and providing a top surface substantially flush with the tops of said cleats, said bead or band having anchoring lugs on the bottom thereof entered in slots provided in said flange in longitudinally spaced relation in register with said lugs, the flange having an annular groove provided therein in which the band or bead is engaged, the slots being spaced lengthwise of said groove.

9. A floor grating construction for vehicles as set forth in claim 1, wherein there is also a band of non-skid material extending all around the pan and enclosing the flange and providing a top surface substantially flush with the tops of said cleats.

10. A floor grating construction for vehicles as set forth in claim 1, wherein there is also a band of non-skid material extending all around the pan and enclosing the flange and providing a top surface substantially flush with the tops of said cleats, the band being of resilient flexible material and of one-piece construction and adapted to be applied over the outer edges of said flange by stretching the band to the extent necessary, the band returning by contraction substantially to its original dimensions so as to enclose the flange therein.

11. A floor grating construction for vehicles as set forth in claim 1, wherein there is also a band of non-skid material extending all around the pan and enclosing the flange and providing a top surface substantially flush with the tops of said cleats, the band being of resilient flexible material and of one-piece construction and adapted to be applied over the outer edges of said flange by stretching the band to the extent necessary, the band returning by contraction substantially to its original dimensions so as to enclose the flange therein, said band having a hole provided therein registering with a hole provided in said flange adapted to receive a fastener for fastening the pan by means of the flange to the floor.

12. A floor grating construction for vehicles as set forth in claim 1, wherein said cleats are of substantially the same width as the tops of the ribs and have their opposite sides substantially flush with the adjacent sides of the ribs for good drainage of dirt and moisture off said cleats into said pan.

13. A floor grating construction for vehicles as set forth in claim 1, wherein said pan is of rectangular form and the combination includes a heel rest pad of non-skid non-metallic material disposed in one front corner portion of said pan at the same elevation as said cleats and overlying and secured to the top of the adjacent rib.

14. A floor grating construction for vehicles as set forth in claim 1, wherein said pan is of rectangular form and said ribs are hollow and said cleats have lugs on the bottom thereof entered in slots provided therefor in the top of said ribs, the combination including a heel rest pad of non-skid non-metallic material disposed in one front corner portion of said pan at the same elevation as said cleats and having a cleat formed integral therewith overlying and secured to the top of the adjacent rib, said cleat having a lug on the bottom of the portion that overlies the rib, said lug being entered with a water-tight fit in a slot provided therefor in the top of said rib.

References Cited by the Examiner
UNITED STATES PATENTS 2,657,948 11/1953 Sturtevant _____ 180—90.6 X
3,087,752 4/1963 Winchester _____ 180—90.6
3,149,875 9/1964 Strata.

BENJAMIN HERSH, *Primary Examiner.*

P. GOODMAN, *Assistant Examiner.*